United States Patent [19]
Quarnstrom et al.

[11] Patent Number: 5,875,340
[45] Date of Patent: Feb. 23, 1999

[54] OPTIMIZED STORAGE SYSTEM AND METHOD FOR A PROCESSOR THAT EXECUTES INSTRUCTIONS OUT OF ORDER

[75] Inventors: Doug Quarnstrom, Fort Collins, Colo.; Ashok Kumar, Santa Clara, Calif.; Gregg Lesartre, Fort Collins, Colo.

[73] Assignee: Hewlett-Packard Company, Palo Alto, Calif.

[21] Appl. No.: 658,909

[22] Filed: May 31, 1996

[51] Int. Cl.$^6$ ...................................................... G06F 9/46
[52] U.S. Cl. ............................................................ 395/733
[58] Field of Search .................................... 395/392, 393, 395/733, 800.23

[56] References Cited

U.S. PATENT DOCUMENTS

| | | | |
|---|---|---|---|
| 5,590,295 | 12/1996 | Deosaran et al. ....................... | 395/393 |
| 5,634,026 | 5/1997 | Heaslip et al. ........................... | 395/393 |
| 5,673,408 | 9/1997 | Shebanow et al. ...................... | 395/375 |

OTHER PUBLICATIONS

Popescu, "The Metaflow Architecture", IEEE, 1991.

*Primary Examiner*—David Y. Eng

[57] ABSTRACT

An optimized storage system is implemented in a processor that executes instructions out of order. The system comprises the following elements. An instruction reordering mechanism is configured to permit execution of the instructions in an out of order sequence. Rename registers (RRs) are associated with the reordering mechanism. Logic causes storage of trap information in the rename registers intermixed with instruction execution results. The trap information may be associated with arithmetic integer or floating point (fp) operations and can include the identity of the trapped instruction, the trapped operation, etc. Logic further causes storage of different sized dependency operands within the RRs. The dependency operands can include, for example, carry borrow (cb) operands and/or shift amount register (sar) operands. The dependency operands are produced by instructions and stored in the rename registers and are also retrieved and utilized by instructions.

10 Claims, 6 Drawing Sheets

OPTIMIZED STORAGE SYSTEM AND METHOD FOR A PROCESSOR THAT EXECUTES INSTRUCTIONS OUT OF ORDER

FIELD OF THE INVENTION

The present invention generally relates to computer processors that execute instructions out of order, and more particularly, to an optimized storage system and method for minimizing storage requirements for traps and dependency operands in a processor that executes instructions out of order.

BACKGROUND OF THE INVENTION

A computer processor (processing unit) generally comprises a control unit, which directs the operation of the system, and one or more arithmetic execution units, which perform computational operations. The execution units can include an arithmetic logic unit (ALU) for integer operations and a multiply accumulate unit (MAC) for floating point operations. The overall design of a processor involves the selection of a register set(s), communication passages between these registers, and a means of directing and controlling how these operate. Normally, a processor is directed by a program, which includes a series of instructions that are kept in a main memory. Each instruction is a group of bits, usually one or more words in length, specifying an operation to be carried out by the processor. In general, the basic cycle of a processor comprises the following steps: (a) fetch an instruction from memory into an instruction register; (b) decode the instruction (i.e., determine what it indicates should be done; each instruction indicates an operation to be performed and the data to which the operation should be applied); (c) carry out the operation specified by the instruction; and (d) determine where the next instruction is located. Normally, the next instruction is the one immediately following the current one.

However, in high performance processors, such as superscalar processors where two or more scalar operations are performed in parallel, the processor may be designed to perform instructions that are out of order, or in an order that is not consistent with that defined by the software driving the processor. In these systems, instructions are executed when they can be executed, as opposed to when they appear in the sequence defined by the program. Moreover, after execution of out of order instructions, the results are ultimately reordered to correspond with the instruction order, prior to passing the results back to the program.

Out of order execution of instructions poses peculiar obstacles from a design perspective. One such obstacle involves tracking instruction dependencies. An instruction, called the "dependent" instruction, is dependent upon another instruction, called the "producer" instruction, when the dependent instruction operates upon an operand or result that is produced from the producer instruction.

As an example, consider an addition operation that has a carry borrow (cb) value that must be transferred from one instruction to another. In this regard, suppose a 64 bit addition is to be accomplished, and the computer is a 32 bit machine. In this scenario, a cb bit must be transferred from the first operation and applied to the second operation.

As another example, consider a shift amount register (sar) operation that involves a control register. A dependent instruction must wait until its producer instruction manipulates the register value.

Generally, dependent instructions are placed after their producer instructions in program order, and therefore, in a typical processor that executes instructions in order, the dependent instructions are executed after their producer instructions, and no execution ordering problems arise. However, in a processor that executes instructions out of order, unless safeguards are implemented, it is possible that a dependent instruction may be executed prior to the producer instruction from which it depends. Accordingly, in some designs of out of order processors, dependency operands need to be tracked.

Another issue that is dealt with in out of order processor designs involves the generation and tracking of trap information. A "trap" is an indicator that is generated to indicate when a special process should be executed by the processor. Traps are well known in the art. The industry standard Precision Architecture for RISC processors defines numerous trap types. Examples are as follows: an "overflow trap," which is initiated by an instruction when a result is too large for the result register and a "privileged operation trap," which is initiated by the operating system when other software, such as application software, attempts to execute an instruction that can only be executed by the operating system. For more information regarding traps, see the widely available publication entitled, "PA RISC 2.0 Architecture," Prentice Hall (1996) or its corresponding predecessor publications regarding Reduced Instruction Set Computer (RISC) architectures.

While a processor executes instructions out of order, the trap and dependency information is stored until the processor can ultimately act upon the information. Needless to say, storage requires memory and space, both of which are expensive commodities in processors and should be minimized in processor designs. Accordingly, a heretofore unaddressed need exists in the industry for systems and methods for reducing the amount of storage necessary for maintaining trap and dependency information in a processor that executes instructions out of order.

SUMMARY OF THE INVENTION

The invention provides an optimized storage system and method for minimizing storage requirements for traps and dependency information in a processor that executes instructions out of order. In general, the invention utilizes rename registers for an instruction reordering mechanism to store trap and/or dependency operands in addition to results from instruction execution.

In architecture, the optimized storage system of the invention is implemented in a processor that executes instructions out of order. The system generally comprises the following elements. An instruction reordering mechanism is configured to permit execution of the instructions in an out of order sequence. Rename registers (RRs) are associated with the reordering mechanism. Logic causes storage of trap information and/or instruction execution results in the rename registers. The trap information may be associated with arithmetic integer or floating point (fp) operations and can include the identity of the trapped instruction, the trap type, the trapped operation, etc. The instruction execution results can include operand dependencies, for example, carry borrow (cb) operands and shift amount register (sar) operands, which are produced by instructions, stored in the rename registers, and retrieved by other instructions. Significantly, operand dependencies of different types and sizes can be stored and intermixed in the same set of rename registers.

In a first embodiment of the optimized storage system, an instruction fetch mechanism fetches instructions for an instruction reordering mechanism. The instruction reordering mechanism receives a set of instructions from the fetch mechanism and permits execution of the instructions in an out of order sequence. Unretired result rename registers and dependency operand rename registers are associated with the reordering mechanism. The unretired result rename registers store results from instruction execution, whereas the dependency operand rename registers store dependency operands, preferably, carry borrow (cb) operands and shift amount register (sar) operands. Worth noting is that the cb and sar operands are different sizes. Logic causes storage of results in the result rename registers when generated by execution of instructions. The logic further causes storage of an operand in the dependency operand rename registers when generated by execution of an instruction that is to produce the operand for another of the instructions. Finally, the logic retrieves an operand that is produced by another of the instructions from the dependency operand rename registers when an instruction is to utilize the operand.

In a second embodiment of the optimized storage system, trap information associated with an arithmetic integer operation is intermixed with unretired results from instruction execution in a common set of rename registers so that storage facilities are optimally utilized. More specifically, an instruction fetch mechanism fetches instructions for an instruction reordering mechanism. The instruction reordering mechanism receives a set of instructions from the fetch mechanism and permits execution of instructions in an out of order sequence. The common set of rename registers is associated with the instruction reordering mechanism for storing both instruction execution results and trap information. Logic causes storage of a result in the rename registers when generated from execution of an instruction. The logic also causes storage of trap information associated with a trapped integer operation in the rename registers when generated from execution of the instruction. The trap information identifies a trap operation to be performed. A trap vector generator receives the trap information when the instruction is retired from the set. The trap vector generator produces a trap vector. The instruction fetch mechanism receives the trap vector and initiates a trap process based upon the trap vector in order to accommodate the trapped integer operation.

In a third embodiment of the optimized storage system, trap information associated with arithmetic floating point (fp) operations is intermixed with unretired results from instruction execution in a common set of rename registers so that storage facilities are optimally utilized. More specifically, an instruction fetch mechanism fetches instructions for an instruction reordering mechanism. The instruction reordering mechanism receives a set of instructions from the fetch mechanism and permits execution of instructions in an out of order sequence. The set of common rename registers is associated with the instruction reordering mechanism for storing both instruction execution results and the fp trap information. Logic causes storage of a result in the rename registers when generated from execution of an instruction. The logic also causes storage of trap information associated with a trapped fp operation in the rename registers when generated from execution of the instruction. The trap information identifies a trap operation to be performed. An exception register receives said trap information. When the next fp instruction is executed, a trap vector generator initiates a fp trap vector to remedy the trap condition. The instruction fetch mechanism receives the trap vector and initiates a trap handler based upon the trap vector in order to accommodate the trapped fp operation. The trap handler reads the exception register to obtain the trap information and executes code to recover from the trap condition.

Other features and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENT

The optimized storage system 10 minimizes storage requirements for traps and dependency operands in a processor 14 that executes instructions out of order by utilizing rename registers for an instruction reordering mechanism to store trap and/or results from instruction execution. The results may include dependency operands, such as carry borrow (cb) operands and shift amount register (sar) operands, which are produced by some instructions and utilized by others.

I. Out Of Order Processor

Figure 1:
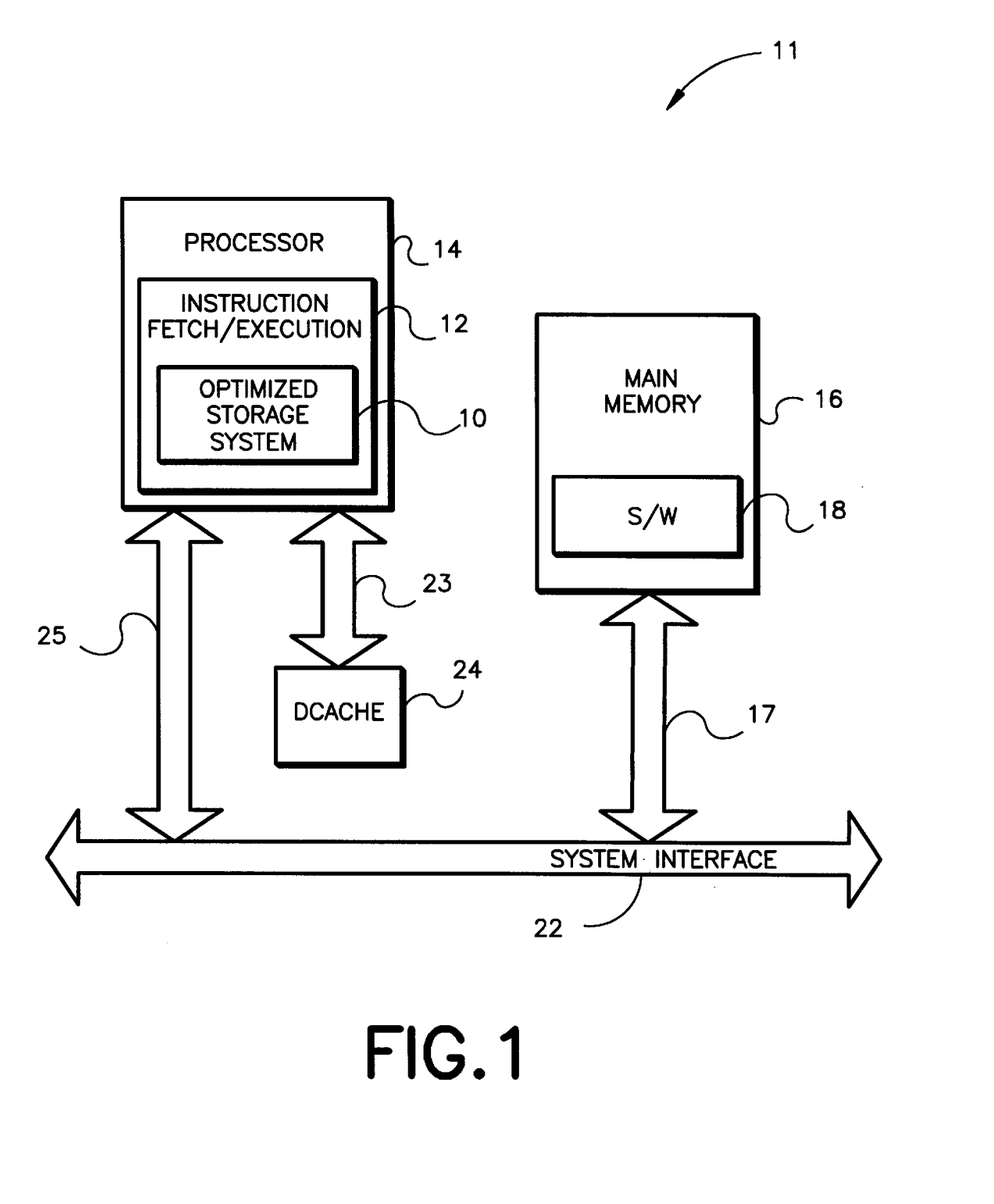
FIG. 1 is a electronic block diagram of a possible implementation of a computer that employs the optimized storage system and method of the invention.

As shown in FIG. 1, the optimized storage system 10 and associated methodology of the present invention is implemented within a computer 11, and particularly, within a fetch/execution system 12 within a processor 14 that executes instructions out of order in the computer 11. The computer 11 generally comprises the processor 14 that executes instructions out of order, a main memory 16, such as a dynamic random access memory (DRAM), having the software 18 for driving the processor 14, a data cache 24 (dcache) interconnected with the processor 14 as indicated by reference arrow 23, and a system interface 22, such as one or more buses, interconnecting the processor 14 and the main memory. The computer 11 may further include input devices, such as a keyboard, and/or output devices, such as a display, which are not shown for simplicity.

As the instruction fetch/execution system 12 in the processor 14 executes the software 18, data that is in current use in the processor 14 is moved into the dcache 24, thereby reducing the average access time for the processor's memory requests and minimizing traffic on the system interface 22. Furthermore, rename registers associated with an instruction reordering mechanism of the instruction fetch/execution system 12 temporarily store trap and/or results from instruction execution to thereby improve processor performance.

II. Instruction Fetch/Execution System

Figure 2:
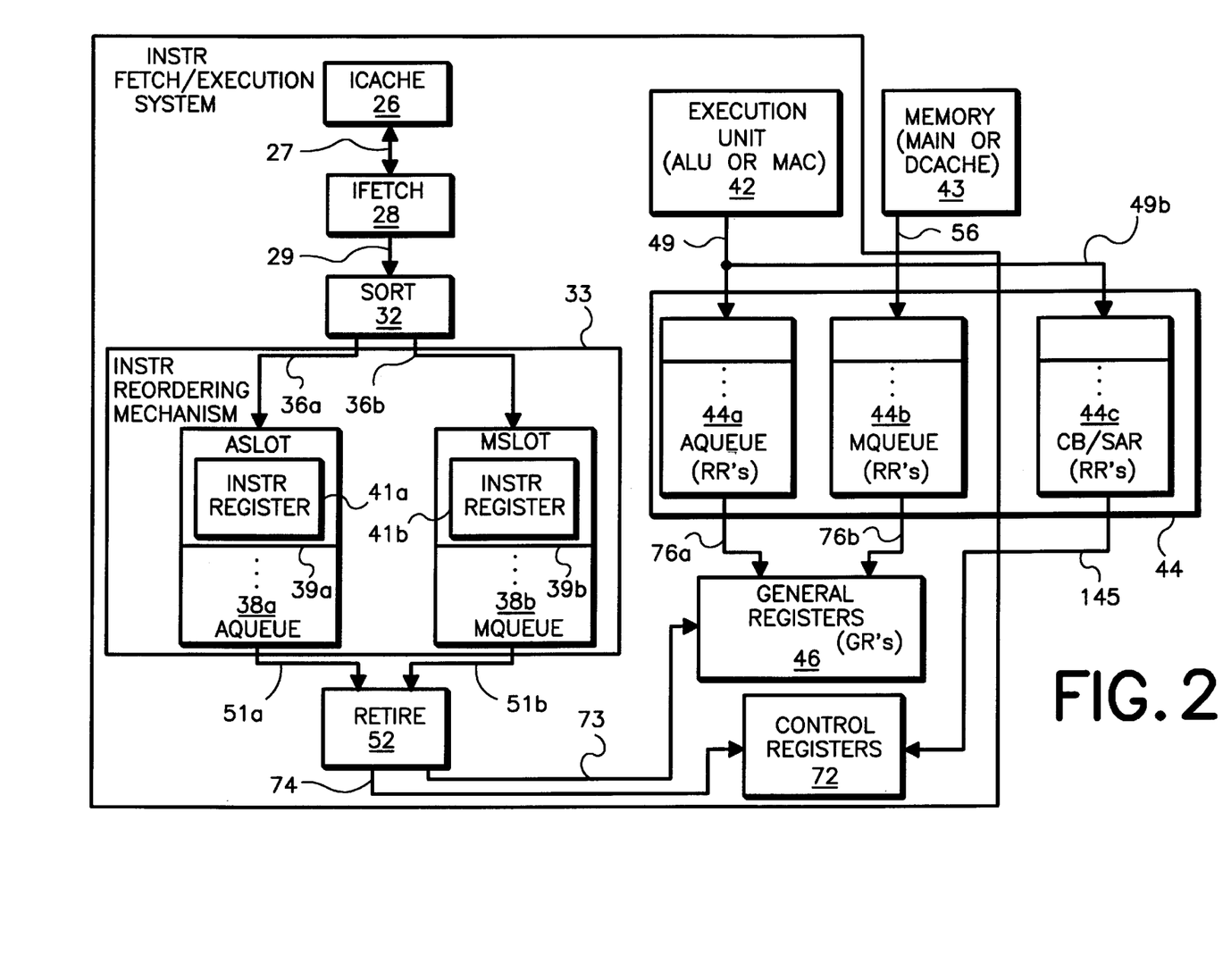
FIG. 2 is a electronic block diagram of a possible implementation of the instruction fetch/execution system of FIG. 1.

A possible implementation of the instruction fetch/execution system 12 is illustrated by way of electronic block diagram in FIG. 2. As shown in FIG. 2, the instruction fetch/execution system 12 has an instruction cache (icache) 26 for storing instructions from the software 18 (FIG. 1). An instruction fetch mechanism (ifetch) 28 communicates with the instruction cache 26 and retrieves instructions from the cache 26 for ultimate execution. In the preferred embodiment, the ifetch mechanism 28 fetches four instructions, each being 32 bits, at a time and transfers the instructions to a sort mechanism 32.

From the sort mechanism 32, the instructions are sent to a suitable reordering mechanism, such as a queue(s) or reservation station. In the preferred embodiment, the instructions are sorted and distributed, or "inserted," into an arithmetic logic unit (ALU) queue (aqueue) and a memory queue (mqueue), depending upon the operation to be accomplished by each instruction. More specifically, the sort mechanism 32 receives the instructions from the ifetch mechanism 28 and determines whether each instruction is directed to an operation involving either (a) an arithmetic execution unit 42 (i.e., either an arithmetic logic unit (ALU) for integer operations or a multiply accumulate unit (MAC) for floating point operations) or (b) the memory 43 (i.e., the dcache 24 or the main memory 16). The sort mechanism 32 distributes arithmetic and memory instructions along respective paths 36a and 36b that are ultimately destined for the aqueue 38a and the mqueue 38b, respectively.

The aqueue 38a contains a plurality (28 in the preferred embodiment) of aslots 39a that have registers 41a for storing respective instructions that are directed to provoking operations at one or more (2 in the preferred embodiment) arithmetic logic units 42. The arithmetic instructions in the aqueue 38a are executed in any order possible (preferably, in data flow fashion). When execution of an instruction is commenced in either the aqueue 38a or the mqueue 38b, then the instruction is said to have "launched." The execution unit 42 retrieves one or more operands from rename registers (RRs) 44a, 44b and general registers (GRs) 46, pursuant to each instruction, and operates upon the operands. As an instruction completes operation upon operands, the results are captured by the aqueue RRs 44a, as indicated by reference arrow 49 and the instruction is marked as complete in the particular aslot 39a of the aqueue 38a. In the preferred embodiment, the aqueue 38a receives up to four instructions (32 bits each) per cycle from the sort mechanism 32 and transfers up to two instructions (preferably, 32 bits each) per cycle to a retire mechanism 52, as indicated by reference arrow 51a.

With respect to instructions that are directed to the mqueue 38b, the instructions are passed through a slot correspondence logic 35, which can be any suitable logic or state machine, for ensuring that the program order of the instructions can be tracked, notwithstanding the separate queues 38a, 38b. Essentially, the instructions are placed in respective slots (aslot, mslot) 39a, 39b within the aqueue 38a and mqueue 38b, and the slot correspondence logic 37 ensures that successive instructions can be tracked for prediction and nullification purposes.

The mqueue 38b contains a plurality (28 in the preferred embodiment) of mslots 39b. Each mslot 39b includes a register 41b for storing a respective memory instruction. Memory instructions in the mqueue 38b can be classified as "loads" and "stores" to memory. A "load" is a request to transfer data from memory 43 (the dcache 24 or the main memory 16) to a register, whereas a "store" is a request to transfer data from a register to memory 43.

During execution of a memory instruction, a first phase involves executing a prescribed mathematical operation on operands with an address calculator (not shown for simplicity) in order to compute an address, and a second phase involves accessing the memory 43 (the main memory 16 or the dcache 24) for data based upon the calculated address. The mqueue 38b executes each of the instructions by performing each of the aforementioned two phases in any order possible (preferably, in data flow fashion). As the memory instructions complete, the results are captured by the mqueue RRs 44b, as indicated by reference arrow 56, and the completed instruction is marked as complete in the mqueue 38b. In the preferred embodiment, the mqueue 38b receives up to four instructions (32 bits each) per cycle from the sort mechanism 32 and transfers up to two instructions (32 bits each) per cycle to the retire mechanism 52, as indicated by reference arrow 51b. For information concerning a preferred method for execution of memory instructions by the mqueue 38b, see copending application entitled "Store-To-Load Hazard Recovery System And Method For A Processor That Executes Instructions Out Of Order," filed on Mar. 1, 1996, and assigned Ser. No. 08/609,581, the disclosure of which is incorporated herein by reference. For more information concerning a preferred method for performing memory accesses pursuant to instruction execution, see copending application entitled "Address Aggregation System And Method For Increasing Throughput Of Addresses To A Data Cache Of A Processor," filed on Mar. 1, 1996, and assigned Ser. No. 08/609,821, the disclosure of which is incorporated herein by reference.

The retire mechanism 52 receives executed instructions (preferably, two 32-bit words per cycle) from each of the queues 38a, 38b. The retire mechanism 52 commits the instruction results to the architecture state. When the retire mechanism 52 commits an instruction's results to the architecture state or when the retire mechanism 52 ignores the results of an instruction that has been nullified in one of the queues 38a, 38b, then the retire mechanism 52 is said to have "retired" the instruction. The software 18 (FIG. 1) is not made aware of any results that are not transformed to the architecture state by the retire mechanism 52. The retire mechanism 52 retires the instructions in the queues 38a, 38b in the program order defined by the software 18 by moving the instruction results to the GRs 46 and/or CRs 72, as indicated by respective reference arrows 73, 74, depending upon the instruction's attributes, and causes the results of the instructions to be passed from the RRs 44a, 44b to the GRs 46, as indicated by the reference arrows 76a, 76b.

Figure 3:
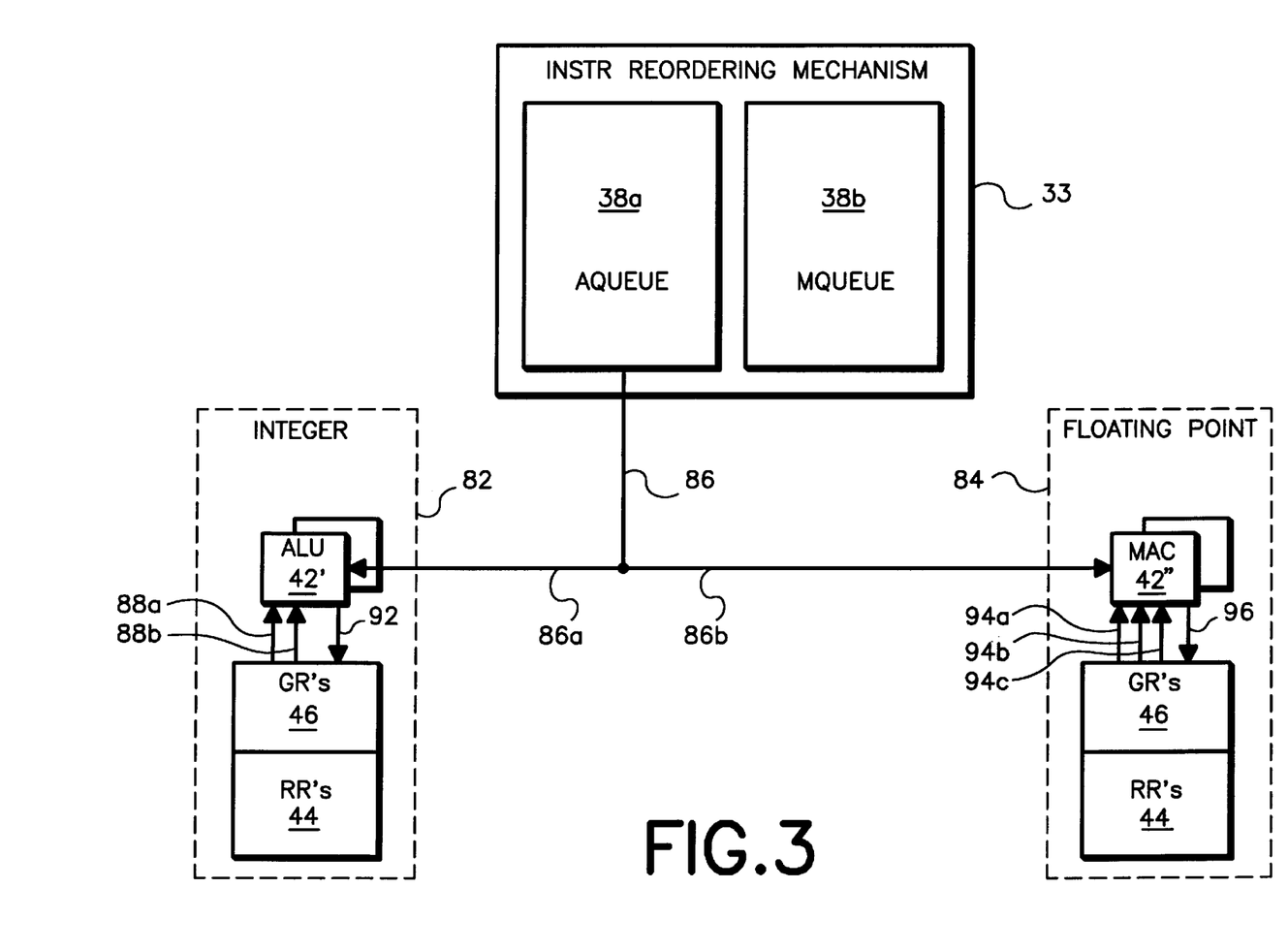
FIG. 3 is a electronic block diagram of integer and floating point data paths that are employed in the instruction fetch/execution system of FIGS. 1 and 2.

With regard to arithmetic instruction execution, the integer and floating point data paths 82, 84 of the instruction fetch/execution system 12 of FIG. 2 are illustrated in FIG. 3. As shown in FIG. 3, arithmetic instructions from the aqueue 38a are broadcast to the integer data path 82 and the floating point data path 84, as indicated by reference arrows 86a, 86b, respectively. One of the data paths 82, 84 operates upon the arithmetic instruction, depending upon whether the instruction involves an integer operation or a floating point operation.

In the preferred embodiment, more than one, preferably two, instructions are forwarded to the integer data path 82 as well as the floating point data path 84 during each cycle. Accordingly, two ALUs 42' are present in the integer data path 82 and two MACs 42" are present in the floating point data path 83 for concurrently executing respective instructions.

In the case of an arithmetic instruction dealing with an integer operation, the instruction is executed by an ALU 42'. When each ALU 42' processes its respective instruction, the ALU 42' reads up to two operands from the GRs 46 and/or the RRs 44, as indicated by reference arrows 88a, 88b. The ALU 42' then operates upon the operands to generate a result that is written to, or forwarded to, the aqueue RRs 44a, as indicated by reference arrow 92.

In the case of a floating point arithmetic instruction, the instruction is forwarded to the MAC 42". When each MAC 42" processes an instruction, the MAC 42" reads up to three operands from the GRs 46 and/or the RRs 44, as indicated by reference arrows 94a, 94b, 94c. The MAC 42" then operates upon the operands and generates a result that is written to, or forwarded to, the aqueue RRs 44a, as indicated by reference arrow 96.

III. Trap Information

A "trap" is an indicator that is generated to indicate when a special process should be executed by the processor 14. Traps can be generated by, for example, the operating system of the software 18 (FIG. 1), the execution units 42, and the reordering mechanism 33.

Figure 5:
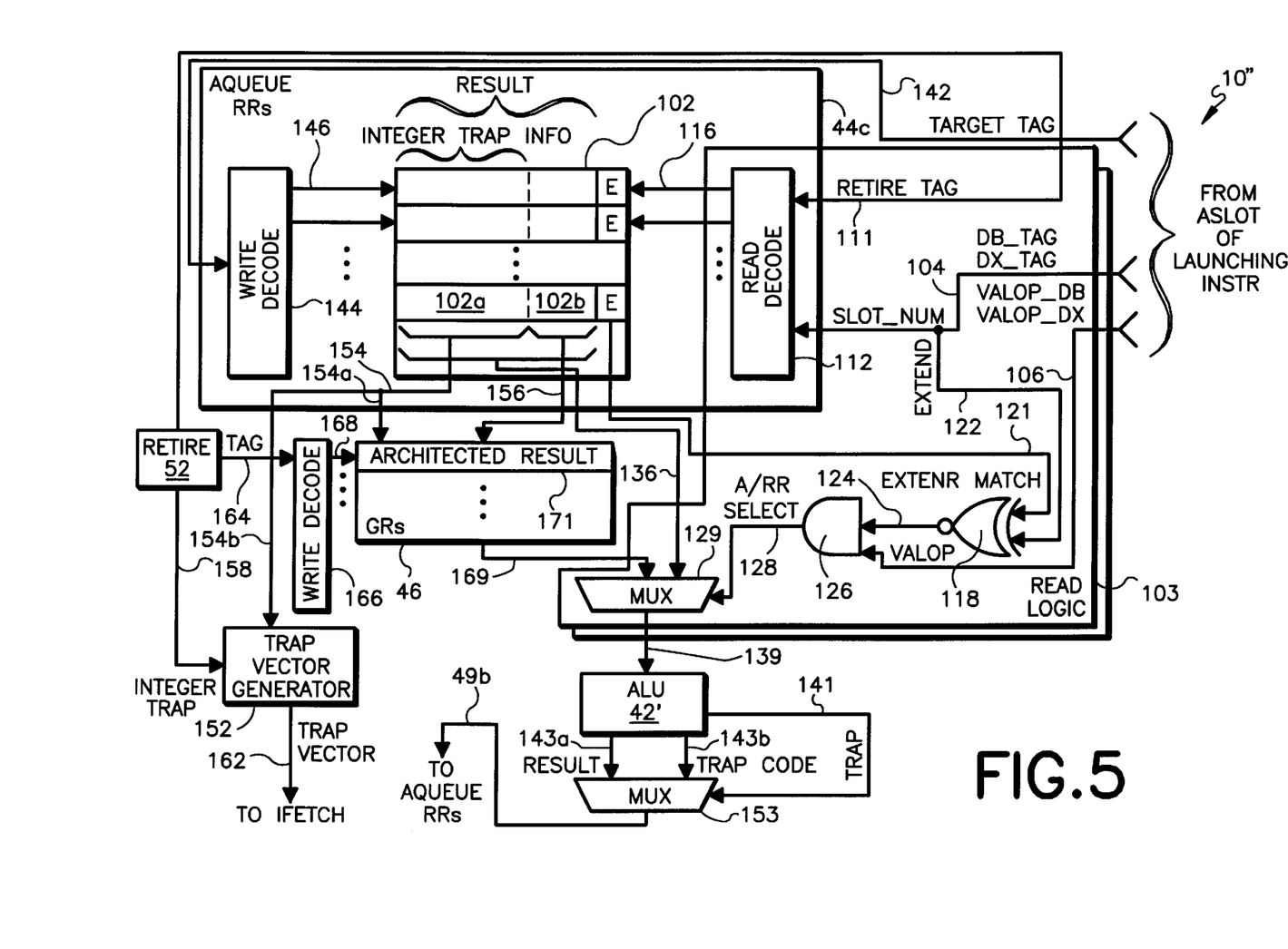
FIG. 5 is a second embodiment of the optimized storage system of FIG. 1 wherein instruction execution results and/or trap information related to an integer operation are stored in rename registers associated with the reordering mechanism of FIG. 2.
Figure 6:
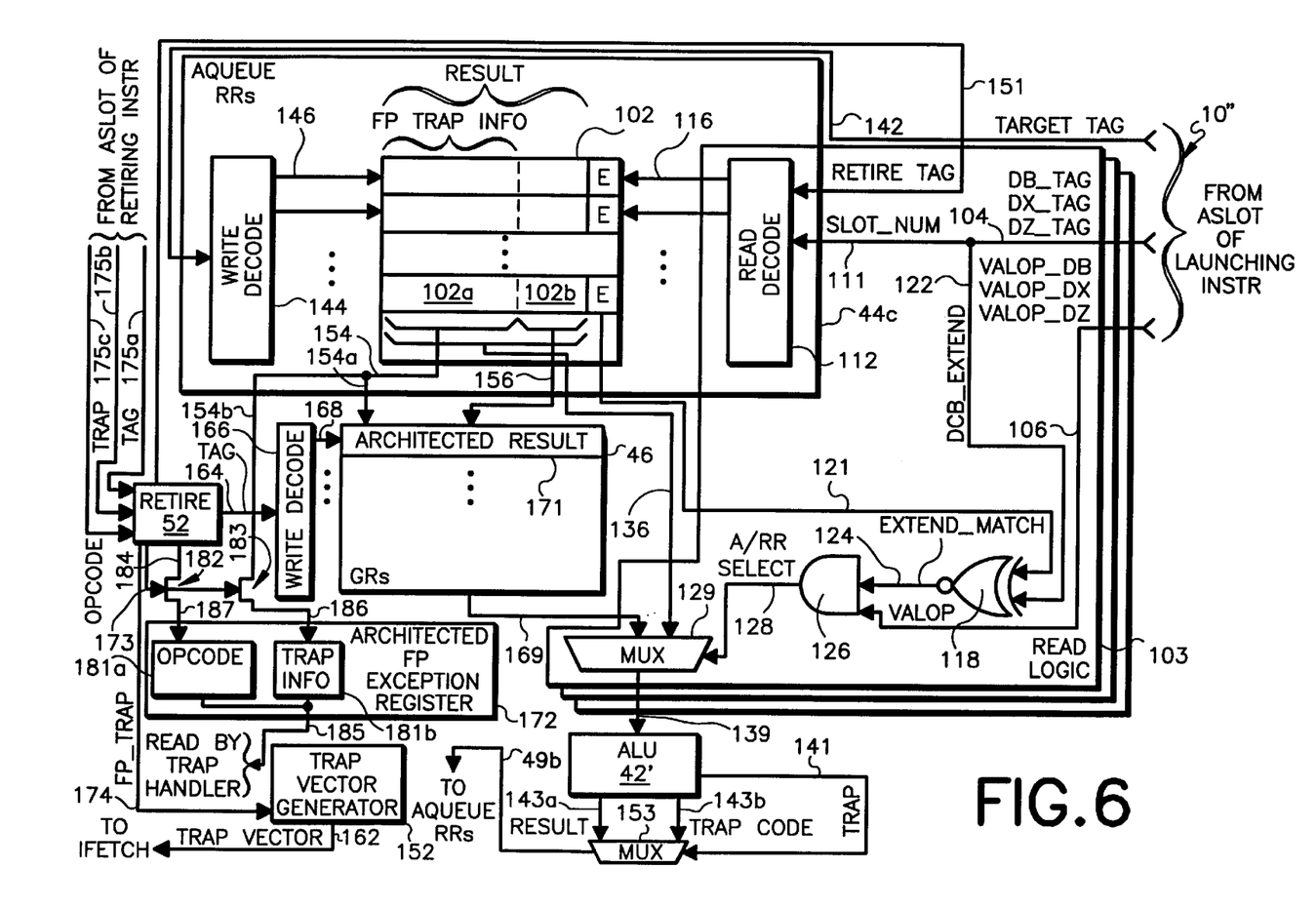
FIG. 6 is a third embodiment of the optimized storage system of FIG. 1 wherein instruction execution results and/or trap information related to a floating point operation are stored in rename registers associated with the reordering mechanism of FIG. 2.

Traps are well known in the art. The industry standard Precision Architecture for RISC processors defines numerous trap types. Examples are as follows: an "overflow trap," which is initiated by an instruction when a result is too large for the result register and a "privileged operation trap," which is initiated by the operating system when other software, such as application software, attempts to execute an instruction that can only be executed by the operating system. For more information regarding traps, see the publication entitled, "PA RISC 2.0 Architecture," Prentice Hall (1996). A trap indicator is associated with an instruction that causes a trap condition during execution of the instruction in the reordering mechanism 33. Moreover, after an instruction is executed, it is retired by the retire mechanism 52. During the retirement process, the retire mechanism 52 recognizes the trap indicator and routes the trap indicator to a trap vector generator 152 (FIGS. 5 and 6). The trap vector generator associated with the retire mechanism causes the ifetch mechanism 28 to call an appropriate trap handler subroutine to deal with the trap.

Needless to say, the trap information should be stored in some manner after it is generated, and it should be retrievable by the retire mechanism 52. The invention provides for an efficient mechanism for accomplishing this task.

IV. Dependency Operands

In a processor that executes instructions out of order, results that are produced by one instruction (producer instruction) and that are to be utilized by another instruction (dependent instruction), or "dependency operands," need to be tracked and are utilized in making decisions as to when instructions are permitted to be executed. As an example, the dependency operands can include carry borrow (cb) operands or shift amount register operands (sar), as is described in copending commonly assigned application (Docket No. 10951230) entitled, "Operand Dependency Tracking System And Method For A Processor That Executes Instructions Out Of Order," by Gregg Lesartre and Ashok Kumar, and incorporated herein by reference.

In this operand dependency tracking system, a first instruction in a first slot that produces an operand that is to be used by a second instruction in a second slot is identified. The second instruction follows the first instruction in program order. A dependency signal is propagated successively through the slots from the first slot to the second slot. When the second slot receives the dependency signal, the second instruction is prevented from launching execution, until after the first instruction launches execution so that the first and second instructions execute substantially concurrently. Furthermore, the operand to be utilized by the second instruction and to be produced by the first instruction must be stored and somehow transferred to the second instruction. The invention provides for an efficient mechanism for accomplishing this task.

V. Optimized Storage System

Figure 4:
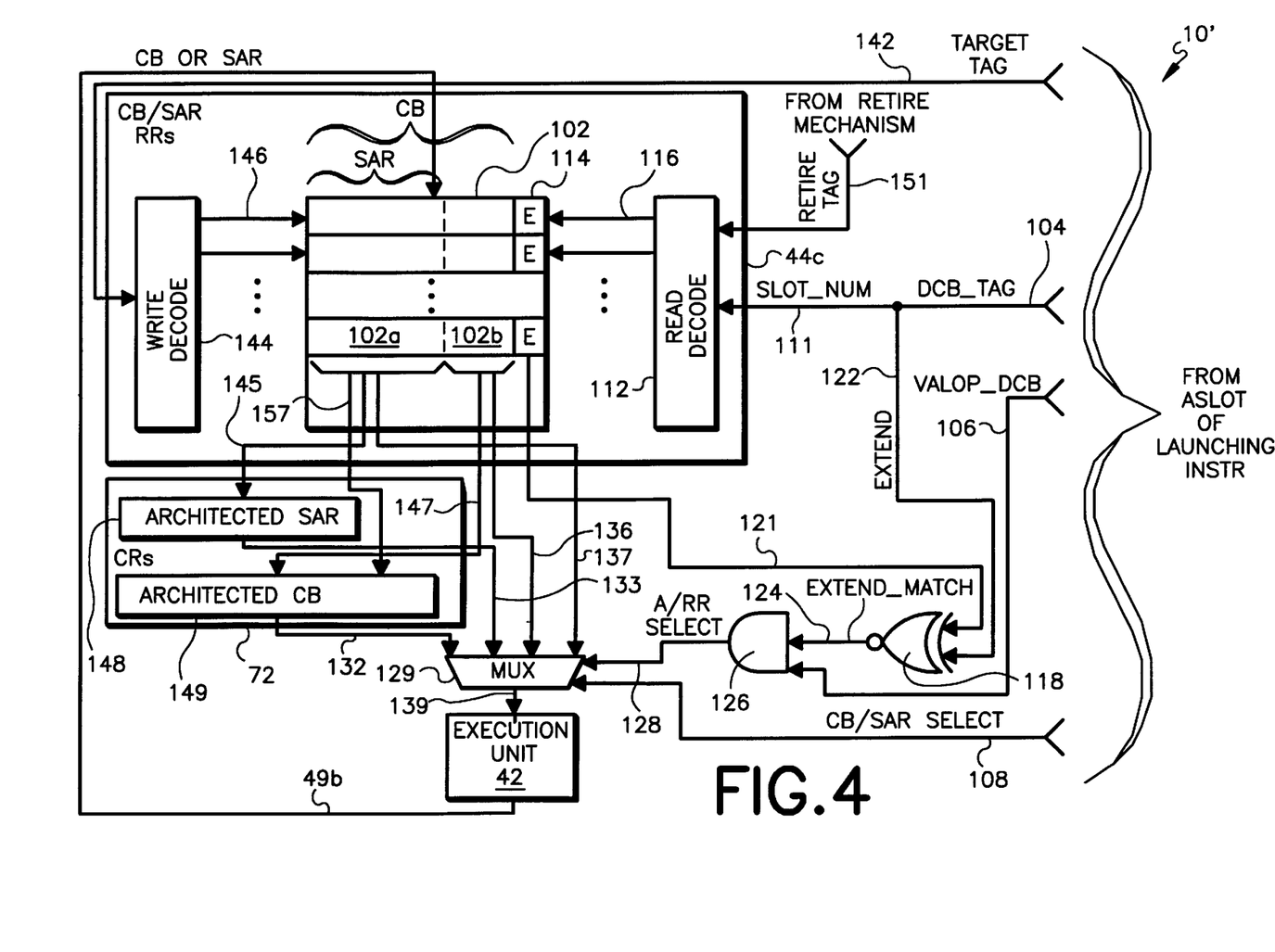
FIG. 4 is a electronic block diagram of a first embodiment of the optimized storage system of FIG. 1 wherein dependency operands, such as carry borrow (cb) operands and/or shift amount register (sar) operands, related to an arithmetic operation are stored in rename registers associated with the reordering mechanism of FIG. 2.

In the preferred embodiment, the optimized storage system is implemented in three configurations. A first embodiment is illustrated in FIG. 4, and generally denoted by reference numeral 10'. In the first embodiment, dependency operands related to an arithmetic operation are stored in operand dependency (cb/sar) rename registers 44c associated with the reordering mechanism 33 (FIG. 2). A second embodiment is illustrated in FIG. 5, and generally denoted by reference numeral 10". In the second embodiment, instruction execution results and/or trap information related to an integer operation are stored in aqueue rename registers 44a associated with the reordering mechanism 33. Finally, a third embodiment is illustrated in FIG. 6, and generally denoted by reference numeral 10'". In the third embodiment, instruction execution results and/or trap information related to a floating point operation are stored in the aqueue rename registers 44a associated with the reordering mechanism 33.

A. First Embodiment For Dependency Operands

The optimized storage system 10' of the first embodiment minimizes storage requirements for dependency operands, particularly cb operands and sar operands. In general, RRs 44c are adapted to store results for dependent instructions, including cb and/or sar operands (one operand to each register within the RRs 44c). The cb operands and sar operands are different data lengths, yet the invention still accommodates efficient storage of both concurrently. Because of this configuration, there is no need for separate storage mechanisms for holding the dependency operands, as it is stored by the cb/sar RRs 44c.

It should be noted that this configuration is possible because cb operands and sar operands are mutually exclusive in that both cannot be produced by the same instruction and both cannot be used by the same instruction.

With reference to FIG. 4, the optimized storage system 10 enables storage of cb operand and/or sar operands and retrieval of these operands when a dependency is cleared. The cb operands and/or sar operands are stored in either the cb/sar RRs 44c when the producer instruction has not yet retired (still resides in the aqueue 38a) or in the CRs 72 when the producer instruction has already retired (and is not situated within the aqueue 38a). While in the cb/sar RRs 44c, the sar operands 102a occupy portion 102a of each register, whereas the cb operands occupy both portions 102a, 102b.

In terms of timing, an instruction is launched, at which point a cb operand or an sar operand may be read from the cb/sar RR 44c, if the instruction is dependent upon such an operand. Just after execution but before retirement, the instruction causes another write cycle to the cb/sar RRs 44c so that if the launching instruction is a producer, it can store the dependency operand for the later dependent instruction. Further, upon retirement of the instruction, there is another read cycle to the cb/sar RRs 44c so that any operands in the cb/sar RRs 44c are committed to the architecture state in the CRs 72.

1. Read Mechanism For Reading From CB/SAR RRs During Instruction Launch

In order to permit reading of operands from the cb/sar RRs 44c by the execution unit 42, the optimized storage system 10' is configured to receive the following signals from the aslot 39a containing the launching instruction when the instruction is launched: a slot identification tag 104 (dcb_tag) to uniquely identify a rename register, a valid operand (valop_dcb) signal 106 to indicate whether or not there exists a valid operand dependency, and a cb/sar operand control signal 108 to indicate whether the read access corresponds with either a cb operand or sar operand.

In the preferred embodiment, the slot identification tag is defined and derived as follows. A slot number is hard wired to each aslot 39a. Moreover, an extend (E) bit toggles between 1 and 0 and is inserted into a local register in each aslot 39a upon insert of a particular instruction. The identification tag defined by the combination of the slot number and the extend bit uniquely identifies the particular instruction, thereby distinguishing the particular instruction from a subsequent instruction that uses the same aslot 39a.

The slot number 111 from the operand connection 104 is passed to the cb/sar RRs 44c, and in particular, to a read decode mechanism 112. This tag 111 is propagated from the producer instruction's aslot 39a to the dependent instruction's aslot 39a. The dependent instruction's aslot 39a drives the tag 111 onto the bus 104 when it launches. The read decode mechanism 112 decodes the slot number 111 and selects one of a plurality of registers 102 to provide the desired operand and the corresponding extend bit (E) 114. The read decode mechanism 112 selects registers 102 via corresponding select connections 116.

When a particular register 102 is selected by the read decode mechanism 112, the extend bit 114 of the particular register 102 is passed to an exclusive-not-OR (XNOR) logic gate 118 as indicated by reference arrow 121 along with the extend bit 122 from the slot identification tag. If the extend bits 121, 122 match, then the operand from the cb/sar RR 44c will be communicated to the execution unit 42, provided that the valop signal 106 is asserted. If either the extend bits 121, 122 do not match or the valop signal 106 is deasserted, then the architected operand in the CRs 72 will be passed to the execution unit 42. In the latter case, the operand has been produced by a retired instruction.

In regard to the extend bits 121, 122, the XNOR logic gate 118 produces a match signal 124 that is combined with the valop signal 106 at an AND logic gate 126. The AND logic gate 126 in turn produces an architected/RR (A/RR) select signal 128 that determines selection between architected values and rename register values. In other words, the A/RR select signal 128 determines whether either an architected operand (on either one of connections 132, 133) or RR results/operands (on either one of connection 137 or both connections 136, 137) are selected by the mux 129 and sent to the execution unit 42 via connection 139.

The cb operand/sar operand select signal 108 specifies which operand, either cb operand or sar operand, is to be provided to the execution unit 42. In other words, the cb operand/sar operand select signal 108 will cause the mux 129 to select either connection sets 132, 136, 137 or 133, 137.

2. Write Mechanism For Writing To CB/SAR RRs After Instruction Execution

In order to permit writing of operands to the cb/sar RRs 44c from the execution unit 42, the optimized system 10' is configured to receive a target slot identification tag (target slot number and extend bit) 142 from the aslot 39a of the executed instruction. The target slot identification tag uniquely identifies the executed instruction in the reordering mechanism 33. The target slot identification tag 142 is passed to the cb/sar RRs 44c, and in particular, to a write decode mechanism 144. The write decode mechanism 144 decodes the target slot identification tag 142 and selects one of a plurality of registers 102 via a corresponding select connection 146 to receive an operand from the execution unit 42, as indicated by reference arrow 49b.

3. Read Mechanism For Reading From CB/SAR RRs During Instruction Retirement

When a launching instruction is retired by the retire mechanism 52, then the dependency operands are converted to the architected state by being transferred from the cb/sar RRs 44c to the CRs 72, as shown in FIG. 4. This operation is prompted by the retire mechanism 52, which forwards a retire tag 151 to the read decode mechanism 112 to cause selection of and a read from a particular register 102. With respect to the dependency operands, the sar operand is transferred from a portion 102a to the architected register 148 in the CRs 72, as indicated by reference arrow 145, and the cb operand is transferred from the combination of portions 102a, 102b to the architected register 149 in the CRs 72, as indicated by reference arrow 147, 157. It should be mentioned that, in the preferred embodiment, only one of the foregoing read/write operations occurs at a time, since only one of the data transfers is meaningful in that the register 102 will include only either a cb operand or an sar operand.

B. Second Embodiment For Integer Traps

A second embodiment of the invention is illustrated in FIG. 5 and generally denoted by reference numeral 10". In general, the optimized storage system 10" involves minimizing storage requirements for integer trap information in the processor 14 (FIG. 1). Pursuant to the invention, the integer trap information and/or unretired results of instruction execution are intermixed and stored in the aqueue RRs 44a. The integer trap information and the unretired results are of different data lengths. The integer trap information is stored in the first portion 102a of each register 102, and each unretired result is stored in and spans over the first and second portions 102a, 102b of each register 102.

In terms of timing, an instruction is launched, at which point results can be read from the aqueue RR 44a. Just after execution but before retirement, a write cycle to the aqueue RRs 44a is accorded the instruction so that the instruction can store either its normal result or integer trap information in the aqueue RRs 44a. The trap information is ultimately used to initiate a trap process upon retirement. Further, upon retirement of the instruction, there is another read cycle from the RRs 44a so that any results are committed to the architecture state in the GRs 46 and so that any integer trap information is forwarded to a trap vector generator 152 for commencing a trap process.

1. Read Mechanism For Reading From Aqueue RRs During Integer Instruction Launch In order to permit reading of results from the aqueue RRs 44a for use by the execute unit 42, the optimized storage system 10" includes a corresponding read logic 103, as shown in FIG. 5, for each operand to be read. In the preferred embodiment, an integer instruction can operate upon up to two operands. Thus, there are two read logics 103 in the optimized storage system 10". For purposes of simplicity, the elements of the read logic pertaining to only one operand will be described hereafter. However, the discussion is equally applicable to the other operand as well.

The read logic 103 of the system 10" is configured to receive the following signals from the aslot 39*a* containing the launching integer instruction when the instruction is launched: (a) a slot identification tag 104 for each operand (db_tag and dx_tag, respectively) in order to uniquely identify a producer instruction and (b) a valid operand signal 106 for each operand (valop_db and valop_dx, respectively) in order to indicate whether or not there exists a valid operand dependency relative to the respective operand.

The slot number 111 from the tag 104 is passed to the aqueue RRs 44*a*, and in particular, to a corresponding read decode mechanism 112. The read decode mechanism 112 decodes the slot number 111 and selects one of a plurality of registers 102 to provide the desired operand and the corresponding extend bit (E) 114. The read decode mechanism 112 selects registers 102 via corresponding select connections 116.

When a particular register 102 is selected by the read decode mechanism 112, the extend bit 114 of the particular register 102 is passed to an exclusive-not-OR (XNOR) logic gate 118, as indicated by reference arrow 121, along with the extend bit 122 from the slot identification tag. If the extend bits 121, 122 match, then the integer trap information or unretired results in the register 102 in the RRs 44*a* will be communicated to the ALU 42', provided that the valop signal 106 is asserted. If the extend bits 121, 122 do not match or if the valop signal 106 is deasserted, then the architected result in the GRs 46 will be passed to the ALU 42'. In the latter case, the results have been produced by a retired instruction. If the register 102 in the RRs 44*a* contains trap information, then the dependent instruction will not retire, since the trap will be taken first, and the result produced by using the trap information as an operand will not be used.

In regard to the extend bits 121, 122, the XNOR logic gate 118 produces a match signal 124 that is combined with the valop signal 106 at an AND logic gate 126. The AND logic gate 126 in turn produces an architected/RR (A/RR) select signal 128 that determines selection between architected values or rename register values. In other words, the A/RR select signal 128 determines whether either an architected result (on connection 169) or RR results/trap information (on connection 136) are sent to the ALU 42' via connection 139.

Upon receipt of the either an architected or nonarchitected result, the ALU 42' operates upon it. If a result is computed, then the ALU 42' will provide it to a multiplexer (mux) 153 as indicated by arrow 143*a*. It is possible that the ALU 42' may initiate a trap, in which case the ALU 42' will provide integer trap code to the mux 153. The ALU 42' controls the mux 153 via connection 141 to provide either unretired results or the integer trap code to the aqueue RRs 44*a* via connection 49.

2. Write Mechanism For Writing To Aqueue RRs After Integer Instruction Execution In order to permit the transfer of unretired results or integer trap information to the aqueue RRs 44*a* from the ALU 42', the optimized system 10" is configured to receive a target slot identification tag (target slot number and extend bit) 142 from the aslot 39*a* of the executed instruction. The target slot identification tag uniquely identifies the executed instruction in the reordering mechanism 33. The target slot identification tag 142 is passed to the aqueue RRs 44*a*, and in particular, to a write decode mechanism 144. The write decode mechanism 144 decodes the target slot identification tag 142 and selects one of a plurality of registers 102 via a corresponding select connection 146 to receive an integer trap information from the ALU 42', as indicated by reference arrow 49*b*.

3. Read Mechanism For Reading From Aqueue RRs During Integer Instruction Retirement When a launching instruction is retired by the retire mechanism 52 and has nontrapped results, then the results are converted to the architecture state by being transferred from the aqueue RRs 44*a* to the GRs 46, as indicated by reference numerals 154, 154*a*, 156 in FIG. 5. This operation is prompted by the retire mechanism 52. In this regard, the retire mechanism 52 forwards a retire tag 151 to the read decode mechanism 112 of the aqueue 44*a* to cause selection of and a read from a particular aqueue RR 102. Further, the retire mechanism 52 communicates a tag 164 to a write decode mechanism 166 associated with the GRs 46. The write decode mechanism 166 decodes the tag 164 and controls an appropriate register 171 in the GRs 46 to receive the result from the aqueue RR 102 via a control connection 168 connected to the register 171. Both portions 102*a*, 102*b* of the unretired result is communicated from the aqueue RRs to the register 171 of the GRs 46 as indicated by respective reference arrows 154, 154*a*, 156.

In the alternative, i.e., when integer trap information is to be transferred from the aqueue RR 102 upon retirement of the instruction, then the retire mechanism 52 is designed to advise the trap vector generator 152 of this fact, as indicated by reference arrow 158, so that the trap vector generator 152 captures the integer trap information from the first portion 102*a* of the particular register 102, as indicated by reference arrow 154. The trap vector generator 152 generates an appropriate trap vector 162 from the integer trap information and passes it to the ifetch mechanism 28 (FIG. 2). The ifetch mechanism 28 will call an appropriate software subroutine to handle the trap vector 162.

C. Third Embodiment For Floating Point Traps

A third embodiment of the invention is illustrated in FIG. 6 and generally denoted by reference numeral 10'''. In general, the optimized storage system 10''' involves minimizing storage requirements for trap information associated with fp operations in the processor 14 (FIG. 1). Pursuant to the invention, the fp trap information and/or results of fp instruction execution are intermixed and stored in the aqueue RRs 44*a*.

In terms of timing, an fp instruction is launched, at which point either fp trap information or unretired results can be read from the aqueue RR 44*a*. Just after execution but before retirement, a write cycle to the aqueue RRs 44*a* is accorded the fp instruction so that the fp instruction can write its normal result or, if trapped, it can store trap information in the aqueue RRs 44*a* to ultimately initiate a trap process. Further, upon retirement of the instruction, there is another read cycle from the GRs 46 so that any results are committed to the architecture state in the GRs 46 and so that any trap information is forwarded to a fp exception register 172.

Floating point operations generally take longer than integer operations. Therefore, for performance reasons, traps are handled a little differently than in the integer case because in the fp case, the processor 14 should not wait for a trap to be handled before commencing the next instruction. In the fp case, a trap vector is not immediately generated by the instruction that caused the trap, but is generated by the next fp instruction to be executed, as will be further described hereafter.

1. Read Mechanism For Reading From Aqueue RRs During Floating Point Instruction Launch In order to permit reading of results from the aqueue RRs 44a by the floating point execution unit 42", the optimized storage system 10'" includes a corresponding read logic 103, as shown in FIG. 6, for each operand to be read. In the preferred embodiment, an fp instruction can operate upon up to three operands. Thus, there are three read logics 103 in the optimized storage system 10". For purposes of simplicity, the elements of the read logic pertaining to only one operand will be described hereafter. However, the elements and discussion are equally applicable to the other operands as well.

The read logic 103 of the system 10'" is configured to receive the following signals from the aslot 39a containing the launching integer instruction when the instruction is launched: (a) a slot identification tag 104 for each operand (db_tag, dx_tag, dz_tag, respectively) in order to uniquely identify a producer instruction and (b) a valid operand signal 106 for each operand (valop_db, valop_dx, valop_dz, respectively) in order to indicate whether or not there exists a valid operand dependency relative to the respective operand. The slot number 111 from each tag 104 is passed to the aqueue RRs 44a, and in particular, to a corresponding read decode mechanism 112. The read decode mechanism 112 decodes the slot number 111 and selects one of a plurality of registers 102 to provide the desired operand and the corresponding extend bit (E) 114. The read decode mechanism 112 selects registers 102 via corresponding select connections 116.

When a particular register 102 is selected by the read decode mechanism 112, the extend bit 114 of the particular register 102 is passed to an exclusive-not-OR (XNOR) logic gate 118 as indicated by reference arrow 121 along with the extend bit 122 from the slot identification tag. If the extend bits 121, 122 match, then the trap information or unretired results in the aqueue RR 44a will be communicated to the MAC 42", provided that the valop signal 106 is asserted. If the extend bits 121, 122 do not match or if the valop signal 106 is deasserted, then the architected result in the GRs 46 will be passed to the MAC 42". In the latter case, the results have been produced by a retired instruction.

In regard to the extend bits 121, 122, the XNOR logic gate 118 produces a match signal 124 that is combined with the valop signal 106 at an AND logic gate 126. The AND logic gate 126 in turn produces an architected/RR (A/RR) select signal 128 that determines selection between architected values or rename register values. In other words, the A/RR select signal 128 determines whether either an architected result (on connection 169) or RR results/trap information (on connection 136) are sent to the MAC 42" via connection 139.

Upon receipt of the either an architected or nonarchitected result, the MAC 42" operates upon it. If a result is computed, then the MAC 42" will provide it to a mux 153 as indicated by arrow 143a. It is possible that the MAC 42" may initiate a trap, in which case the MAC 42" will provide fp trap code to the mux 153. The MAC 42" controls the mux 153 via connection 141 to provide either unretired results or the fp trap code to the aqueue RRs 44a via connection 49.

2. Write Mechanism For Writing To Aqueue RRs After Floating Point Instruction Execution In order to permit the transfer of unretired results or fp trap information to the aqueue RRs 44a from the MAC 42", the optimized system 10" is configured to receive a target slot identification tag (target slot number and extend bit) 142 from the aslot 39a of the executed instruction. The target slot identification tag uniquely identifies the executed instruction in the reordering mechanism 33. The target slot identification tag 142 is passed to the aqueue RRs 44a, and in particular, to a write decode mechanism 144. The write decode mechanism 144 decodes the target slot identification tag 142 and selects one of a plurality of registers 102 via a corresponding select connection 146 to receive either the execution result or fp trap information from the MAC 42", as indicated by reference arrow 49b.

3. Read Mechanism For Reading From Aqueue RRs During Floating Point Instruction Retirement When a launching fp instruction is retired by the retire mechanism 52 and has nontrapped fp results, then the results are converted to the architecture state by being transferred from the aqueue RRs 44a to the GRs 46, as indicated by reference numeral 154, 154a, 156 in FIG. 6. This operation is prompted by the retire mechanism 52.

In this regard, the retire mechanism 52 is configured to receive a tag 175a that identifies the results (or trap information) from the retiring instruction and uses it to forward a retire tag 151 to the read decode mechanism 112 of the aqueue 44a to cause selection of and a read from a particular register 102. Further, the retire mechanism 52 is configured to communicate a tag 164, based upon the tag 175a, to a write decode mechanism 166 associated with the GRs 46 (FIG. 2). The write decode mechanism 166 decodes the tag 164 and controls an appropriate register 171 in the GRs 46 to receive the result from the aqueue RR 102 via a control connection 168 connected to the register 171. Both portions 102a, 102b of the unretired result is communicated from the aqueue RRs to the register 171 of the GRs 46 as indicated by respective reference arrows 154, 154a, 156.

In the alternative, i.e., when fp trap information is to be transferred from the aqueue RR 102 upon retirement of the instruction, then the retire mechanism 52 is designed to cause an architected fp exception register 172 to read the trap information and related operation code (opcode) information that defines the trapped operation. Specifically, in addition to receiving the trap bit 175b from the retiring instruction, the retire mechanism 52 also receives the opcode 175c of the trapped instruction. The retire mechanism 52 outputs a trap signal 173 based upon the trap signal 175b. The trap signal 173 actuates transistors 182, 183, which communicate the opcode 184 of the trapped instruction and the trap information 154b from the aqueue RRs 44a, respectively, to the fp exception register 172.

When the next fp instruction (the one after the trapped instruction) retires, the retire mechanism 52 is designed to indicate to the trap vector generator 152 to take an fp exception trap, as indicated by reference arrow 174. In response, the trap vector generator 152 issues a trap vector signal 162 to the ifetch mechanism 28 (FIG. 2). The trap vector generator 152 passes the trap vector to the ifetch mechanism 28 (FIG. 2), as indicated by reference arrow 162. The ifetch mechanism 28 is configured to call an appropriate software subroutine to handle the trap vector 162. After being called, the trap handler reads the opcode 181a and the trap information 181b from the architected fp exception register 172 and executes code to recover from the trap condition.

Many variations and modifications may be made to the preferred embodiment of the invention as described previously. As an example, instructions in the preferred embodiment were reordered in queues 38a, 38b; however, one with skill in the art would realize that instructions can be reordered in any suitable reordering mechanism, including a reservation station. All such modifications and variations are intended to be included herein within the scope of the present invention, as is defined by the following claims.

Finally, in the claims hereafter, the structures, materials, acts, and equivalents of all "means" elements, "logic" elements, and steps are intended to include any structures, materials, or acts for performing the functions specified in connection with said elements.

Wherefore, the following is claimed:

1. A method for minimizing storage requirements for trap information in a processor that executes instructions out of order, the method comprising the steps of:

obtaining a set of said instructions for execution in an out of order sequence;

executing an instruction of said set of instructions to derive a result;

when said instruction of said set of instructions is absent of a trap indicator, then storing said result of said instruction in a rename register that is assigned to said instruction; and when said instruction of said set of instructions includes said trap indicator, then storing said trap information that identifies a trap operation in said rename register that is assigned to said instruction.

2. The method of claim 1, further comprising the step of storing said trap information regarding a floating point operation.

3. The method of claim 1, further comprising the step of storing said trap information regarding an integer operation.

4. The method of claim 1, further comprising the steps of:

transferring said trap information to a trap vector generator when said instruction is retired from said set: and producing a trap vector with said trap vector generator from said trap information;

communicating said trap vector to an instruction fetch mechanism; and initiating a trap process with said instruction fetch mechanism based upon said trap vector.

5. The method of claim 4, further comprising the step of communicating said trap vector to said fetch mechanism when a later instruction is executed.

6. A system for minimizing storage requirements for trap information in a processor that executes instructions out of order, the system comprising:

a reordering mechanism configured to permit execution of said instructions in an out of order sequence;

rename registers; and logic configured to cause storage of a result in said rename registers when generated from execution of one of said instructions in said reordering mechanism, said logic configured to cause storage of said trap information in said rename registers when generated from execution of said instruction in said reordering mechanism, said trap information identifying a trap operation to be performed.

7. The system of claim 6, wherein said trap information regards a floating point operation.

8. The system of claim 6, wherein said trap information regards an integer operation.

9. The system of claim 6, further comprising:

a trap vector generator configured to receive said trap information when said instruction is retired from said set; said trap vector generator configured to produce a trap vector; and an instruction fetch mechanism configured to fetch instructions and configured to receive said trap vector, said instruction fetch mechanism configured to initiate a trap process based upon said trap vector.

10. The system of claim 9, further comprising the steps of:

an exception register configured to receive said trap information when said instruction is retired from said set; and a trap handler configured to retrieve said trap information from said exception register when prompted by said instruction fetch mechanism.

* * * * *

UNITED STATES PATENT AND TRADEMARK OFFICE
CERTIFICATE OF CORRECTION

PATENT NO.   : 5,875,340
DATED        : February 23, 1999
INVENTOR(S)  : Doug Quarnstrom et al.

It is certified that error appears in the above-identified patent and that said Letters Patent is hereby corrected as shown below:

Column 4,
Lines 16, 19, 22 and 25, delete "a electronic" and insert therefor -- an electronic --

Column 15,
Line 11, after "order" insert -- by eliminating a need for separate storage mechanisms for holding separate trap information --

Column 16,
Line 6, after "order" insert -- by eliminating a need for separate storage mechanisms for holding separate trap information --

Signed and Sealed this

Eighteenth Day of March, 2003

JAMES E. ROGAN
*Director of the United States Patent and Trademark Office*